United States Patent

Wang et al.

[11] Patent Number: 5,974,202
[45] Date of Patent: Oct. 26, 1999

[54] APPARATUS AND METHOD FOR PROCESSING A MACHINE READABLE DOCUMENT WITH EMBEDDED MACHINE INSTRUCTIONS

[75] Inventors: Ynjiun P. Wang, Fort Myers, Fla.; Chung-Chi Li, Bothell, Wash.

[73] Assignee: Symbol Technologies, Inc., Holtsville, N.Y.

[21] Appl. No.: 08/730,858

[22] Filed: Oct. 18, 1996

Related U.S. Application Data

[63] Continuation-in-part of application No. 08/414,849, Mar. 31, 1995, Pat. No. 5,644,408, which is a continuation-in-part of application No. 07/461,881, Jan. 5, 1990, Pat. No. 5,304,786.

[51] Int. Cl.⁶ ..................................... H04N 1/32
[52] U.S. Cl. .......................... 382/306; 358/442; 358/448
[58] Field of Search .................... 358/442, 468, 358/434–436, 438, 439, 448; 235/462, 456; 399/77, 80–84; 395/112; 382/163, 175, 306; H04N 1/00, 1/32

[56] References Cited

U.S. PATENT DOCUMENTS

| | | |
|---|---|---|
| 4,248,528 | 2/1981 | Sahay ........................................ 355/308 |
| 4,499,499 | 2/1985 | Brickman et al. ........................ 358/263 |
| 4,716,438 | 12/1987 | Farrell ........................................ 355/6 |
| 4,757,348 | 7/1988 | Rourke et al. ............................... 355/6 |
| 4,760,606 | 7/1988 | Lesnick et al. ............................ 382/48 |
| 5,051,779 | 9/1991 | Hikawa ..................................... 355/200 |
| 5,060,980 | 10/1991 | Johnson et al. ............................ 283/70 |
| 5,084,769 | 1/1992 | Miura ....................................... 358/403 |
| 5,113,445 | 5/1992 | Wang ....................................... 235/462 |
| 5,115,326 | 5/1992 | Burgess et al. .......................... 358/440 |
| 5,129,016 | 7/1992 | Murakami et al. ........................ 382/61 |
| 5,133,026 | 7/1992 | Fujiwara et al. .......................... 382/61 |
| 5,227,893 | 7/1993 | Ett ............................................ 358/400 |
| 5,243,655 | 9/1993 | Wang ....................................... 235/462 |
| 5,287,202 | 2/1994 | Kumarappan ............................ 358/440 |
| 5,299,027 | 3/1994 | Nakamura et al. ...................... 358/403 |
| 5,319,181 | 6/1994 | Shellhammer et al. ................. 235/462 |
| 5,384,836 | 1/1995 | Otsuka ..................................... 379/100 |
| 5,485,287 | 1/1996 | Nakamura et al. ...................... 358/426 |

*Primary Examiner*—Kim Yen Vu
*Attorney, Agent, or Firm*—Gary Serbin

[57] ABSTRACT

A method and apparatus is provided for controlling the function of document processing machines such as copying machines and facsimile machines. Control data is submitted to a controller in a two-dimensional symbology having error correcting capability. The control data is decoded and used to process a plurality of documents without the need of a manual keying of instructions by an operator controlling the document processing machine.

23 Claims, 5 Drawing Sheets

APPARATUS AND METHOD FOR PROCESSING A MACHINE READABLE DOCUMENT WITH EMBEDDED MACHINE INSTRUCTIONS

REFERENCE TO RELATED APPLICATIONS

This application is a continuation-in-part of Chung-Chi Li et al., application Ser. No. 08/414,849, filed Mar. 31, 1995, entitled "Apparatus for Processing Human-Readable and Machine-Readable Documents," which is a continuation-in-part application of Ynjiun P. Want et al, application Ser. No. 07/461,881, filed Jan. 5, 1990 and entitled "Non-Volatile Electro-Optical Read-Only Memory with High Density Dimensional Symbology," now issued as U.S. Pat. No. 5,304,786. The disclosures of these applications are incorporated herein by specific reference.

BACKGROUND OF THE INVENTION

1. Field of the Invention

The present invention generally relates to the processing of printed machine instructions and, more particularly, systems and apparatus for creating, reproducing, disseminating and storing machine instructions in the form of an encoded symbol.

2. Description of the Prior Art

Currently, more and more emphasis is being placed on the dissemination of information and the accuracy of such information. While a vast amount of data and information is disseminated by electronic networks, such as computer networks, a great deal of information is still distributed in printed form. Only printed information in hard copy form that can be readily saved and reproduced for future reference, is truly capable of providing lasting comfort to a large percent of the population. Unfortunately, the dissemination of printed material is cumbersome, slow and unreliable as compared to the electronic transfer of information and data, and further, once information is in printed form it is difficult to return the information and data to electronic form. Thus, in circumstances where the information being communicated includes instructions on the reproduction, distribution and handling of printed matter it is incumbent on the originator of the instructions to provide job instructions which are not subject to "interpretation" or undesired revision. A facsimile copy of a document destined for a customer should not be erroneously faxed to a competitor, nor should a copy operator make one thousand copies of a manual on the wrong size paper.

One commonly used approach for representing information in a highly convenient machine readable form is to encode the information into a pattern of indicia having elements of different reflectivity, such as the ubiquitous UPC bar code symbol. The bar code symbol is optically scanned and the resulting signals are decoded into data representing the symbol encoding. This data can then be readily entered into and processed by a data processing system. Typical bar code symbols, such as the UPC symbol, are one-dimensional in character and thus are extremely limited in amount of data that can be encoded therein.

Prior art patents, such as U.S. Pat. Nos. 4,757,348 to Rourke et al., 4,716,438 to Farrel, and 4,248,528 to Sahay, have described photocopiers having integrated bar code readers for scanning control sheets fed through a document feeder. The control sheets include copying instructions which were are presented to the copying machine as either an encoded one-dimensional bar code job number on the margin of the document, or a hand-filled job sheet processed by a scanner below the platen of the copier. The job sheets are placed between jobs which are stacked together to avoid stopping and reprogramming each job after the end of a prior job. These systems provided "batch" job capabilities. The prior art bar coded sheets employed one-dimensional bar codes which referenced a job number. The job number referred the controller of the printer to a pre-stored job program stored in the copier's memory. The operator was first required to program the job or job exception into the copying machine through the machine controller such as a standard control panel on the copier where the job program was stored. To enable the particular job that the operator programmed to be matched to a specific document batch, a specific job identifier (e.g., job number) is input to the machine by the operator of the job. A job sheet including the job identifier is then placed, i.e., interleaved, at the beginning of the documents to be processed. Thus, as provided in the '438 patent (col. 6, lines 4–34), and the '348 patent (col. 6, lines 23–53), the job sheet functions as a job identifier for a job which was previously programmed and stored on the copying machine.

The '528 patent describes a job sheet having job instructions to be submitted into a copier feeder. The job sheet included a number of fill-in areas which an operator filled in and placed at the beginning of a set of documents to be processed.

In the above-cited issued patent, U.S. Pat. No. 5,304,786, a two-dimensional bar code symbol is disclosed, which has high information density and capacity capabilities, as well as error detection and correction features. This symbol, known as the PDF417 symbol, is capable of representing as many as 500 characters per square inch of ASCII data. Thus, a relatively small number of PDF417 symbols, and in some cases a single PDF 417 symbol, has the capacity to encode alphanumeric text and control data filling a letter-size document.

SUMMARY OF THE INVENTION

In the above-cited copending application Ser. No. 08/414, 849, a system and method is described for, inter alia, inserting control data decoders in facsimile and photocopier devices for decoding control data submitted with documents to be copied and/or delivered by facsimile. Two-dimensional bar coded signals represent a highly effective means of presenting control instructions to a machine which would normally be printed down on paper, and submitted to a human intermediary for "keying" into a control panel, and in some prior art devices given a job number which would have to be associated with the correct set of materials from a large number of materials submitted for processing. Thus, before a copy is made or a facsimile is delivered in a large organization, "job" instructions are normally processed from the originator to an assistant who would write the instructions down, fill out a "job" sheet and deliver the materials and instructions to a processing center. The materials and instructions would then be processed by a operator which would have to key in instructions on the machine in questions and in some systems, identify the instructions with a job number which would also need to be associated with the materials to be processed. Examples of such manual keying operations are present in most large copying centers and at large institutions having a large quantity of facsimile deliveries. This arrangement results in a large number of erroneous jobs, misbilled jobs and misdirected material.

The present invention is directed to a method of processing job requests on documents containing machine readable symbols. The symbols are encoded with a two-dimensional bar code symbology and include control data to be processed by a controller for a copier, facsimile machine or other machine requiring entry and job instructions. A printed symbol including control data is created including information such as billing data, identity of person requesting job function, destination of job results, instructions for original materials, number of copies to be generated etc. Once the printed symbol is generated, the symbol is optically read to generate symbol data which is converted to control data by a decoder. In the event of a copier or facsimile machine, a printer or photostatic copier connected to the decoder performs printing, billing and copying instructions in accordance with control data decoded from the printed symbol.

With entry into a decoder, the printed information content of the printed symbol can be readily processed and displayed for final modifications before electronic transfer either by facsimile transmission or RF transmission to another computer or prior to commencing a copy job. The information can also be reformatted or edited in the computer in accordance with the control data and then printed out to provide a revised document. In addition to the control data, the symbol may also be provided with printed information content. This information could include encoded bit map and rich text format data for original documents to be copied or otherwise transmitted by the machine in question.

In accordance with another feature of the present invention, the information encoded in the printed symbol can include an identifier of the application program as well as an identifier of the specific template utilized to generate and/or modify the control data and printed information content. When the symbol is scanned, decoded and entered into a computer, the identifier of the application program and the identifier of the template are utilized by the computer to initiate the appropriate application program and template in the computer to further modify the variable data of the printed information content.

To create a printed document bearing the encoded symbol having control data, the control data including the job instructions is entered into a computer which may be provided in the form of a kiosk or other terminal. The instructions are encoded and printed in a symbol code format. In accordance with another feature of the present invention, a separate sheet containing only control data for a copier or facsimile machine may be submitted to the machine together with an original document to provide copy, edit and distribution instructions to the machine. For instance, a separate encoded symbol control data sheet could be scanned in by a scanner attached to a copying machine. The scanner would be connected to the controller of the copying machine and would scan the symbol which would include copying instructions such as number of copies, amount of reduction/enlargement, billing information, stapling and numbering instructions and paper type. The copying machine would then proceed to copy the documents in the handler of the copying machine in accordance to the instruction included on the encoded symbol.

Additional features and advantages of the present invention will be set forth in the description which follows and in part will be apparent from the description, or may be learned by practice of the invention. The objectives and other advantages of the invention will be realized and attained by the apparatus particularly pointed out in the detailed description and appended claims, as well as the accompanying drawings.

It is to be understood that both the foregoing general description and the following detailed description are intended to provide further explanation of the invention as claimed.

The accompanying drawings are included to provide further understanding of the invention and are incorporated in and constitute a part of the specification, illustrate several embodiments of the invention and together with the specification serve to explain the principles of the invention.

DETAILED DESCRIPTION OF PREFERRED EMBODIMENT

This invention is designed to create a virtual paper or dynamic document control environment which avoids the problems of the prior art. In a preferred embodiment, job instructions for the processing of printed documents are submitted in the form of control data encoded in a machine readable format such as a two-dimensional bar coded symbol. By providing control data on a document that is machine-readable, the control data document can be readily recreated and disseminated without accidental modification. In addition, by providing a corresponding human-readable representation of the data on the same document, the information may be further understood and associated by an operator without machine assistance.

Figures 1, 2:
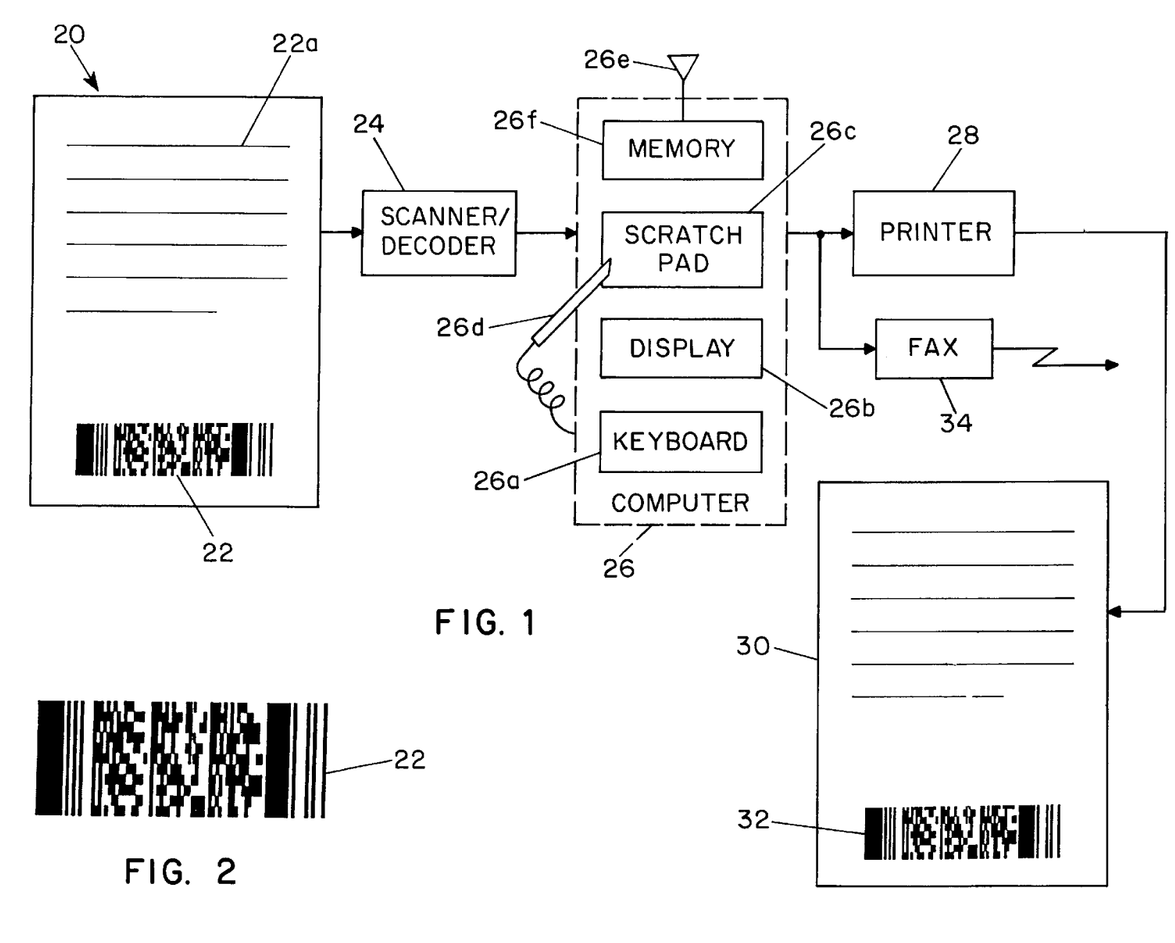
FIG. 1 is a block diagram illustrating apparatus constructed in accordance with one embodiment of the present invention.
FIG. 2 is an illustration of an exemplary two-dimensional bar code symbol having utility in the present invention.

FIG. 1 shows how a document containing encoded information may be used by computers. In FIG. 1, an original document 20 bears an encoded symbol and typically, but not necessarily, printed information 22a. Symbol 22 is encoded with information relating to the entire printed information 22a on the document 20, or relating to at least a portion of the printed information 22a on the document 20. In the illustrated examples, the encoded information in the symbol 22 includes job instructions for the operation of a document processing machine such as a facsimile and copier.

A symbol having sufficient information density and capacity to encode the information content of at least a portion of the printed information 22a is the PDF417 two-dimensional bar code symbol disclosed in the above-cited related application Ser. No. 07/461,881. An example of this symbol is illustrated in FIG. 2. It should be noted that throughout this application, whenever a single symbol is shown, in the event the capacity requirements for storing the printed information 22a exceeds that of a single symbol, multiple symbols may be used. For example, PDF417 has a macro mode in which multiple PDF417 symbols can be utilized to store up to hundreds of thousands bytes of information. The macro mode is described in the PDF417 specification published by Symbol Technologies, Inc.

The symbol 22 is read by a scanner/decoder 24 in order to enter the information encoded in the symbol 22 into a computer 26. Scanner/decoder 24 is preferably of the laser beam scanning type or CCD/CMD imaging type, such as disclosed in commonly assigned U.S. patent application Ser. No. 07/851,493, filed Mar. 16, 1992 and entitled "Method and Apparatus for Decoding two-dimensional Bar Code Using CCD/CMD Camera". A suitable laser beam scanner/decoder is disclosed in commonly assigned U.S. patent Ser. No. 07/851,505, filed Mar. 16, 1992 and entitled "System for Encoding and Decoding Data in Machine Readable Graphic Form." The disclosures of these copending applications are specifically incorporated herein by reference. Scanner/decoder 24 thus includes a device to decode the symbol 22 into a form that can be read by computer 26. Scanning machine readable symbol 22 is better than scanning the printed information 22a because the data can be read into a computer more rapidly and accurately than an OCR (optical character reader) page scanner, for example. This is because symbol 22 can include error detection and correction capabilities, such as in the case of the PDF417 code.

Computer 26 may be a pen-based computer including a keyboard 26a, a display 26b and a scratch pad 26c for accepting handwritten entries using a pen 26d. Keyboard 26a and/or pen 26d are used to add, delete, rearrange or otherwise edit the printed information 20a of document 20, which is stored in computer memory 26f after the symbol 22 is scanned and decoded by the scanner/decoder 24. Display 26b is used to display the information content of the document as obtained by the scanner/decoder 24 from symbol 22 for viewing and editing.

Many known computer programs can be used for viewing and editing the information content of the document within the memory 26f of computer 26. In one illustrative embodiment, wherein the main body of the document contains both job instructions and original text, the symbol 22 is encoded to store the entire representation of the printed information 22a in Rich Text Format (RFT). The computer 26 is then arranged to utilize a standard word processing program, such as, for example, WordPerfect. The Rich Text Format (RTF) representation of the printed information 22a which is encoded in the symbol 22 is obtained and decoded by the scanner/decoder 24 and is provided to the memory 26f of the computer 26. As will be appreciated by one skilled in the art, the WordPerfect processing program can import the Rich Text Format representation of the printed information 22a into the WordPerfect processing environment and various editing functions can be performed on the information content of the document 20. The resulting edited information content of the document can then be stored in the memory 26f of the computer 26. There are many other known formats, other than RTF, that can be utilized for representing the printed information 22a, such as, for example, ASCII format, Adobe Acrobat format, etc. Alternatively, in the event the document 20 is only intended to carry job instructions, as discussed further below, the information on the symbol 22 will include only a identifier of the program utilized to create the encoded data, the identity of the machine on which the documents were to be processed, and a summary of the job instructions in order to minimize the amount of information to be transmitted in the form of an encoded symbol.

Regardless of the information being carried on the document 30, computer 26 can also be programmed to change the encoding of symbol 22 to reflect the editing performed on the information content of document 20. For example, after the editing is performed on the document in the WordPerfect environment, the resulting edited document can be stored in Rich Text Format (RTF) within the memory 26f. The computer 26 then encodes the contents of the Rich Text Format representation of the edited document into a new symbol which is stored in the memory 26f of the computer 26. Corresponding edits could also be made and recorded to the control data embedded in the decoded symbol 22. For instance, a destination fax number could be changed to reflect a new or modified destination phone number. The encodation of a PDF417 symbol is described in related application Ser. No. 07/461,881, and need not be described further. Alternatively, it is possible to change the encoding of the symbol in real time fashion to reflect the editing performed on the information content of the document. For example, each time a key on the computer 26 is pressed during the editing process, an encodation routine is run to encode the data into the new symbol which is then stored in the memory 26f.

There are several mechanisms for obtaining the edited information from the memory 26f of computer 26. When called for, the edited document may be retrieved from computer memory 26f and printed out by printer 28 as an edited document 30, with or without an encoded symbol 32, where the encoded symbol 32 corresponds to the new symbol previously stored in the memory 26f, and therefore represents the contents of the document as edited by the computer 26. Also, the edited document can be transmitted directly from the memory 26f of computer 26 by a facsimile machine 34 or a facsimile board (not shown) within computer 26. Alternatively, a facsimile transmission can be generated from document 30 by facsimile machine 34. Computer 26 may also be equipped with an RF communicator 26e to permit broadcasting of edited document 30 to remote receivers. The facsimile transmission from facsimile machine 34 and the broadcast through RF communicator 26e would be controlled by the control data encoded on symbol 22, as edited by computer 26.

As can be appreciated, the symbol 32 of edited document 30 can now be scanned by the apparatus described with reference to FIG. 1 so as to permit subsequent editing of the information content of the document 30. In this manner, efficient exchange of information is effected, without loss of data content, between various apparatus as described with reference to FIG. 1. In addition, a trail could be generated and encoded onto the symbol 32 of each transmission, edit and other activity to which the document 30 is being subjected.

Figure 3:
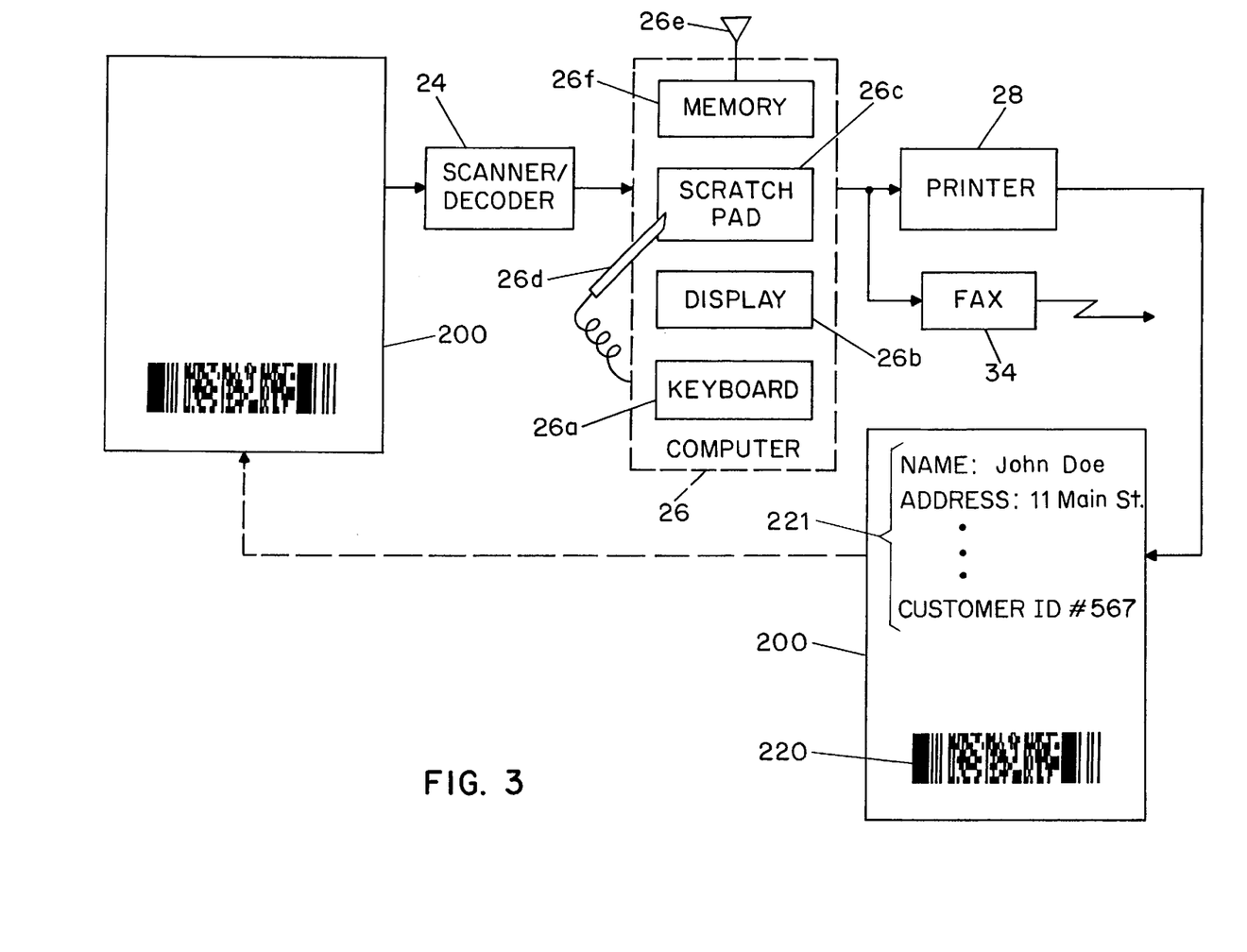
FIG. 3 is a diagram illustrating apparatus constructed in accordance with yet another embodiment of the present invention.
Figure 4:
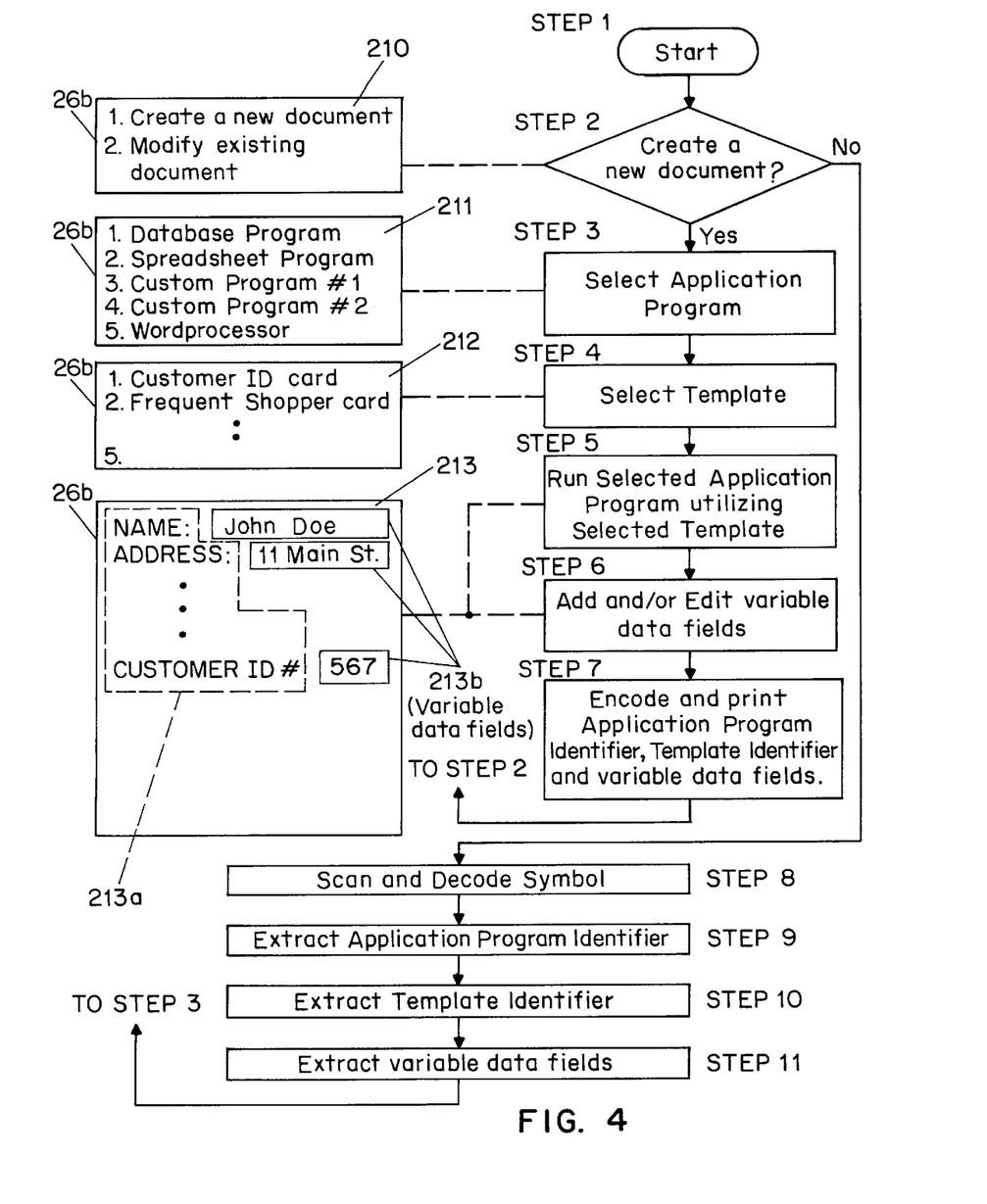
FIG. 4 is a flow chart illustrating the operation of the embodiment of FIG. 3.

A still further embodiment is now described with reference to FIGS. 3-4. In FIG. 3, elements which are the same as those described previously with reference to FIG. 1 are similarly numbered and therefore description thereof is omitted. In this embodiment, the computer 26 utilizes an application program, such as, for example, a database program such as MicroSoft Access, or a custom designed application program, to enter variable data which will then be printed onto document 200. As will be appreciated by those skilled in the art, such application programs have the capability of utilizing predefined templates for controlling the entry of the variable data. FIG. 4 is a flow-chart to illustrate this particular embodiment and includes representations of the display 26b of the computer 26 during various steps in the flowchart.

Referring now to the flowchart of FIG. 4:

Step 1: START—A computer program residing in the memory 26f of the computer 26 is started.

Step 2: CREATE A NEW DOCUMENT—The computer 26 displays on the display 26b a prompt 210 querying whether a new document is to be created or whether an existing document is to be modified. If a user selects creating a new document (e.g., entering a "1"), progress is made to Step 3.

Step 3: SELECT APPLICATION PROGRAM—The computer 26 displays on the display 26b a prompt 211 querying which application program is to be utilized. In this example, the desired application program is selected by entering a number "1" through "5", each of which corresponds to a different application program. For this example, assume that a "1" is selected, and therefore, a database application, such as, for example, MicroSoft Access, is selected. While the remainder of this embodiment will illustrate a database application, as can be appreciated by one skilled in the art, many other types of application programs can be selected, such as, for example, a spreadsheet program, word-processing programs, as well as custom programs.

Step 4: SELECT TEMPLATE—The computer 26 displays on the display 26b a prompt 212 querying which template is to be utilized. In this example, the desired template is selected by entering a number "1" through "5", each of which corresponds to a different template. It should be noted that different templates may exist for each application program described in Step 3, however, at this point only those templates associated with the selected application are displayed and available for selection. For this example, assume that a "1" is selected, and therefore, a Customer ID Card template is selected. While the remainder of this embodiment will illustrate a Customer ID Card template, as can be appreciated by one skilled in the art, a large number of varied templates may be configured for use by each application program.

Step 5+6: RUN SELECTED APPLICATION PROGRAM UTILIZING SELECTED TEMPLATE—; —ADD AND/OR MODIFY VARIABLE DATA FIELDS—The computer initiates the selected application program and utilizes the selected template. Prompt 213 illustrates by way of example the display 26b of a database application program utilizing a Customer ID Card template. In this example, the template information 213a, which is fixed, describes the functions of each of the variable data fields 213b. The variable data fields 213b contain the information which can be entered and modified from the keyboard 26a of pen 26d. In this example, the variable data fields 213b contain information, such as, for example, the name of the customer, the address of the customer, and the customer ID#, etc.

Step 7: ENCODE AND PRINT APPLICATION PROGRAM IDENTIFIER, TEMPLATE IDENTIFIER, AND VARIABLE DATA FIELDS—The computer 26 executes an encode routine, such as, for example, a PDF417 encoding routine, which encodes into a symbol: (i) an application program identifier which uniquely identifies the application program, (ii) a template identifier number which uniquely identifies the template utilized, and (iii) the variable data fields. By way of example, the application program identifier and the template identifier may each be an alpha-numeric character string. The encoded symbol is then printed by the printer 28 on a document 200 as symbol 220. The document 200 also includes human readable information 221 which is generated by the computer 26, where the human readable information includes the variable data fields, and may or may not include information obtained from the template as well as other information generated by the application program. After printing document 200, the application program is exited and progress is made to Step 2.

Step 8: This Step 8 is entered when the user elected at Step 2 to modify an existing document. Accordingly, referring to FIG. 3, the document 200 which was generated in Steps 3–7 is presented to the scanner/decoder 24. The scanner/decoder 24 scans and decodes symbol 220.

Step 9: The application program identifier contained in the decoded symbol 220 is stored in memory for subsequent use as an entry at Step 3.

Step 10: The template identifier contained in the decoded symbol 220 is stored in memory for subsequent use as an entry at Step 4.

Step 11: The variable data contained in the decoded symbol 220 is stored in memory for subsequent use as the variable data fields at Steps 5 and 6.

Progress is then made to Steps 3–6 which operate as previously described, except (i) the selection of the application program at Step 3 is automatically performed by the computer 26 on the basis of the application program identifier stored in memory at Step 9, (ii) that the selection of the template at Step 4 is automatically performed by the computer 26 on the basis of the template identifier stored in memory at Step 10, and (iii) the variable data fields initially added at Step 6 are automatically set by the computer 26 on the basis of the variable data fields stored in memory at Step 10.

Accordingly, as can be appreciated, document 200 carries all the information in symbol 220 to enable a computer 26, which contains corresponding application programs and templates to edit the variable data of the document, and then to print a new document 200 containing the edited information. The above embodiment utilized the same computer 26 for initially generating the document 200 and for subsequent scanning/decoding and modification of the document; however, as can be appreciated by those skilled in the art, a second computer having substantially the same function as computer 26 can be used for the subsequent scanning/decoding and modification of the document 200.

As can be appreciated, in accordance with the apparatus of FIGS. 3 and 4, very complicated documents 200 can be generated without requiring that the fixed information to be printed on the document be contained in the symbol 220. The symbol 220 is merely required to store the variable data fields, and the application and template identifiers, and is not required to carry any of the specific information relating to the fixed information printed on the document. For example, assuming that document 220 is a tax return document, where a majority of the information printed is fixed (e.g., dictated by the IRS). The only variable data fields are those required to be provided by the tax return filer. All the data relating to the fixed printed information is stored in the various application programs and templates contained within the computer 26. Similarly, control data can also be stored as variable field entries, and the encoded symbol 200 could include an application and template identifiers. The application and template identifiers should include the type of control data stored, i.e., control data for a specific facsimile machine, in order, to avoid incompatibility between control data instructions for a different machine.

Figure 5:
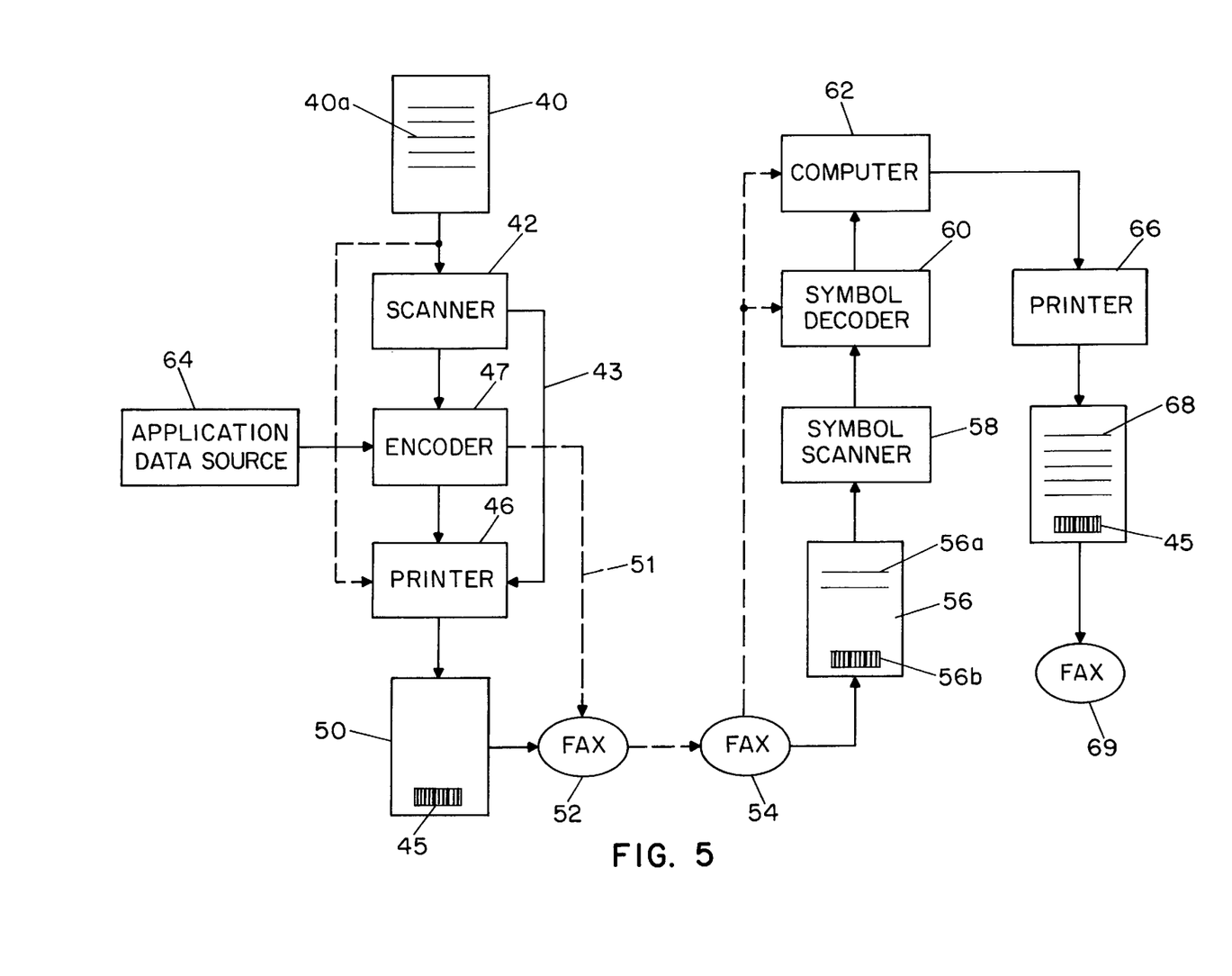
FIG. 5 is a block diagram illustrating apparatus constructed in accordance with an additional embodiment of the present invention.

FIG. 5 shows apparatus for generating and then transmitting a document with an encoded symbol in accordance with a further embodiment of the present invention. In FIG. 5, an original document 40, containing alphanumeric text 40a, is read by a page scanner 42. Encoder 44 converts alphanumeric text 40a into a highly compressed coded symbol 45. The format of symbol 45 is preferably the PDF417 format. The functions of scanner 42 and encoder 44 may be combined in a single scanner/encoder. A suitable scanner/encoder is disclosed in the above-cited copending application Ser. No. 07/851,505. The bar coded symbol 45 is then printed by a printer 46 on a document 50. Several approaches may be taken in the generation of document 50. First, printer 46 may simply print the coded symbol 45 onto a label (not shown) which is then adhered to a margin of original document 40 so as not to obscure text 40*a*. Alternatively, original document 40 may be fed through printer 46, as illustrated by phantom line 41, and coded symbol 45 is simply printed in one of the margins of the original document. Also, the scanner output data of the document text 40*a* may be supplied to printer 46 over line 43. In this case, the printer 46 reprints the text 40*a* in conjunction with coded symbol 45 on a clean document sheet. Document 50 thus represents either original document 40 bearing encoded symbol 45 or a reprint of the original document bearing coded symbol 45.

In addition, symbol 45 can be encoded by encoder 44 to also include application data generated by a source 64. This application data includes information that does not appear in the document text. Such application data may identify particular software used to generate the original document text, such as word processing software or spreadsheet software. In addition, symbol 45 may be encoded to include formulas used to calculate numerical information included in the original document text. Knowledge of such underlying document information can be quite beneficial to the recipient of the document and, unless encoded in symbol 45, is unavailable to the recipient. Other examples of beneficial underlying document information that can be included in bar coded symbol 45 will occur to those knowledgeable in the art.

The encoded symbol 45 may also include data for controlling dissemination of all or portions of the content of original document 40. For example, the symbol 45 may include control data specifying a limited number of facsimile transmissions of document 50, a time limit for such transmissions, a list and destination code of those authorized to receive such transmissions, or a limitation as to what portions of the original document can be transmitted. Transmitting facsimile machines, such as machine 52, would then include a decoder to extract this control data from the scanned symbol and be controlled accordingly.

In an analogous application, a photocopier could be similarly equipped to extract the control data from a symbol being copied along with an original document. This control data would then be used to control the number of duplicate copies permitted, set copier parameters, set time limits, and so on. As with the facsimile transmission, the control data stored in the symbol may be provided as a separate document or label, or as an integral part of the original document.

Figure 6:
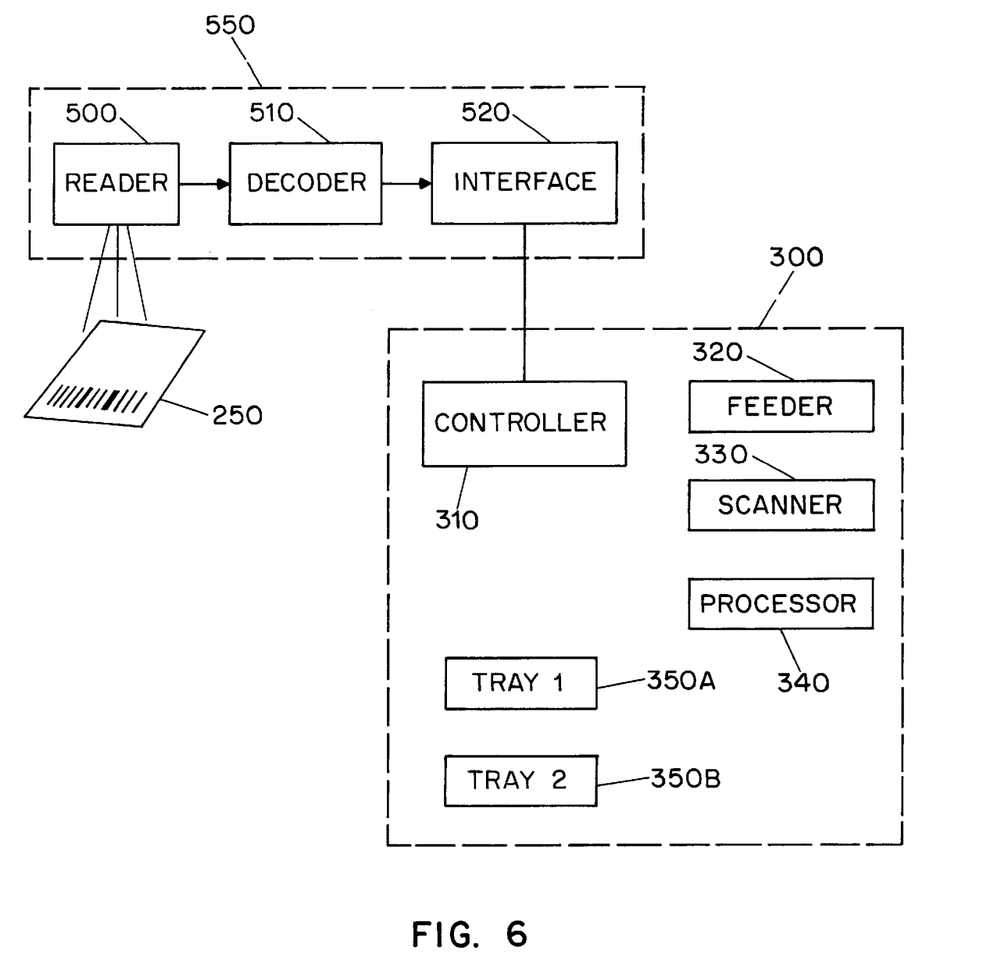
FIG. 6 is a block diagram illustrating an apparatus constructed in accordance with yet another embodiment of the present invention.

A sample application of a copying machine incorporating a controller of the present invention is shown in FIG. 6. In FIG. 6 a bar code reader 500 is coupled to a decoder 510 and an interface 520. The bar code reader 500, decoder 510 and interface 520 may be housed in a casing 550. The decoder 510 and interface 520 decode and transmit the signals generated by the bar code reader into control data for the controller 310. The controller 310 controls the hardware of the copier 500, such as the paper trays 350A or 350B, the paper feeder 320, the scanner 330, the document processor 340, and its functions, i.e., the number of copies per original document, collating, stapling, marking, etc.

An encoded symbol card 250 provides "job" instructions to the copier for documents 200. The encoded symbol card 250 is preferably a printout generated by an application program designed to generate control codes for the copier 300. As discussed above, the encoded symbol card 250 could include a generic application program identifier and the decoder 510 would be provided with decoding program which would convert the bar coded control data into corresponding control data instructions for the attached copying machine. A user enters the copy instructions on a data entry device of the computer 26. The computer 26 operates an application program requesting entry of the job control instructions, such as user identification data, billing numbers and other relevant information.

Once completed, the computer generates a control data file including the copying instructions and other user information and creates a bar coded symbol for such control data. In the case of a copying machine, the control card would be read by the bar code reader after the copies were placed in the copying tray or otherwise prompt the operator to insert the original documents in the document feeder 320. The copy job would commence upon reading of the bar code symbol.

In an alternative embodiment, the symbol having the control data is submitted to the copier as the first page to be processed. The copier would be provided with an internal two-dimensional bar code reader. Upon the scanning of the first page, the copier would automatically search for the symbol, decode the signal and submit the appropriate control data to the copier controller 310.

Alternatively, multiple copy jobs could be stacked on top of each other and the copier would scan each document for control data symbols.

In an alternative embodiment, a standard facsimile may be provided with an encoded control job sheet for directing the transmission of the facsimiles to be distributed. Accordingly, as with the copying application described above, a facsimile job could be placed in a facsimile machine (either in memory or in a document feeder), and the transmission of the documents would be made in accordance with the job control sheet. Thus, in FIG. 6, the copying machine 300 could be a facsimile machine except that the printing function would be replaced with a dialing and facsimile transmission function.

In both applications, either for a copier or a facsimile machine, the printed two dimensional bar coded symbol 250 would include a job type descriptor. For instance, a copy job would include a copy job loader to let the decoder know that it should deliver instructions to the controller of the copier. Thus, in the event the bar code reader identifies a symbol having data which is not is usable by the machine it is connected with, the reader/decoder can generate an error signal such as an audible beep or other user perceptible error signal.

It will be apparent to those skilled in the art that various modifications and variations can be made in the apparatus of the present invention without departing from the spirit or scope of the invention. Thus, it is intended that the present invention cover the modifications and variations of this invention provided they come within the scope of the appended claims and their equivalents.

We claim:

1. A method for submitting a plurality of control data and document data to a document processing machine for processing at least one document, said method comprising the steps of:
   (a) generating a two-dimensional bar coded symbol including the plurality of control data and document data;
   (b) printing the two-dimensional bar coded symbol;
   (c) reading the plurality of control data and document data from the printed two-dimensional bar coded symbol using a two-dimensional bar code reader;

(d) submitting the plurality of control data to a control processor of the document processing machine; and (e) processing the document data in accordance with the control data.

2. The method of claim 1 wherein the two-dimensional bar coded symbol is PDF417.

3. The method of claim 1 wherein the printed two-dimensional bar coded symbol is disposed on a first one of said plurality of documents.

4. The method of claim 1 wherein the printed two-dimensional bar coded symbol is read by a bar code laser scanner.

5. A method for submitting a plurality of control data to a document processing machine for processing at least one document, said method comprising the steps of:

(a) generating a two-dimensional bar coded symbol including the plurality of control data by (i) initiating an application program on a computer having a data entry device and a data display device, said application program displaying a plurality of job instructions for a copying application;

(ii) selecting at least one of the plurality of job instructions displayed on the data entry device;

(iii) converting said selected at least one of the plurality of job instructions into the plurality of control data; and (iv) encoding said plurality of control data into the two-dimensional bar coded symbol;

(b) printing the two-dimensional bar coded symbol;

(c) reading the plurality of control data from the printed two-dimensional bar coded symbol using a two-dimensional bar code reader;

(d) submitting the plurality of control data to a control processor of the document processing machine; and (e) processing the plurality of documents in accordance with the control data.

6. The method of claim 5 further comprising the step of encoding the identity of an individual selecting the plurality of job instructions onto the printed two-dimensional bar coded symbol.

7. The method of claim 6 further comprising the step of generating an information record for the individual selecting the plurality of job instructions.

8. The method of claim 5 further comprising the steps of generating an application code and encoding said application code onto the printed two-dimensional bar coded symbol.

9. A copying machine for copying a plurality of documents in accordance with a set of job instructions encoded on a printed two-dimensional bar coded symbol including the set of job control instructions and a document data, said copying machine comprising:

a two-dimensional bar code reader for reading the printed two-dimensional bar coded symbol;

an interface coupled to said two-dimensional bar code reader for receiving from the two-dimensional bar code reader an electrical representation of the set of job instructions and document data encoded on the printed two-dimensional bar coded symbol and for decoding the received electrical representation of the set of job instructions and the document data encoded on the printed two-dimensional bar coded symbol;

a controller coupled to the interface for receiving from the interface the decoded electrical representation of the set of job instructions encoded on the printed two-dimensional bar coded symbol and for controlling a set of copier functions in accordance with the set of job instructions encoded on the printed two-dimensional bar coded symbol;

a document processor coupled to the controller for performing the set of copier functions in accordance with the set of job instructions encoded on the printed two-dimensional bar coded symbol, whereby the plurality of documents is processed in accordance with the set of job instructions encoded on the printed two-dimensional bar coded symbol.

10. The copying machine of claim 9 wherein the two-dimensional bar code reader is a two-dimensional bar code laser scanner.

11. The copying machine of claim 9 wherein the two-dimensional bar coded symbol is a PDF417 encoded symbol having error correcting functions.

12. The copying machine of claim 9 further comprising a control panel having a manual override function key for pausing the document processing means during the performance of the set of copier functions in accordance with the set of job instructions encoded on the two-dimensional bar coded symbol.

13. The copying machine of claim 9 wherein the two-dimensional bar coded symbol includes an application code for identifying a job type, said interface further comprising a job type comparator interface ensuring that the job instructions encoded on the two-dimensional bar coded symbol may be processed with the document processor.

14. A copying machine for copying a plurality of documents in accordance with a set of job instructions encoded on a printed two-dimensional bar coded symbol, said copying machine comprising:

a two-dimensional bar code reader for reading the printed two-dimensional bar coded symbol;

an interface coupled to said two-dimensional bar code reader for receiving from the two-dimensional bar code reader an electrical representation of the set of job instructions encoded on the printed two-dimensional bar coded symbol and for decoding the received electrical representation of the set of job instructions encoded on the printed two-dimensional bar coded symbol;

a controller coupled to the interface for receiving from the interface the decoded electrical representation of the set of job instructions encoded on the printed two-dimensional bar coded symbol and for controlling a set of copier functions in accordance with the set of job instructions encoded on the printed two-dimensional bar coded symbol;

a communication bus coupled to the interface for communication of a plurality of billing information decoded from the two-dimensional bar coded symbol to a remote billing subsystem, whereby the plurality of billing information is encoded on the printed two-dimensional bar code symbol as part of the job instructions; and a document processor coupled to the controller for performing the set of copier functions in accordance with the set of job instructions encoded on the printed two-dimensional bar coded symbol, whereby the plurality of documents is processed in accordance with the set of job instructions encoded on the printed two-dimensional bar coded symbol.

15. A copying machine for copying a plurality of documents in accordance with a set of job instructions encoded on a printed two-dimensional bar coded symbol including the set of job control instructions and a document data, said copying machine comprising;

a two-dimensional bar code reader for reading the printed two-dimensional bar coded symbol;

an interface coupled to said two-dimensional bar code reader for receiving from the two-dimensional bar code reader an electrical representation of the set of job control instructions and the document data encoded on the printed two-dimensional bar coded symbol and for converting the received electrical representation of the set of job instructions encoded on the printed two-dimensional bar coded symbol into a control data set;

a controller coupled to the interface for receiving from the interface the control data set and for controlling a set of copier functions in accordance with the control data set; and a document processor coupled to the controller for performing the set of copier functions on the document data in accordance with the control data set, whereby the plurality of documents is processed in accordance with the set of job instructions encoded on the printed two-dimensional bar coded symbol.

16. The copying machine of claim 15 wherein the two-dimensional bar code reader is a two-dimensional bar code laser scanner.

17. The copying machine of claim 15 wherein the two-dimensional bar coded symbol is a PDF417 encoded symbol having error correcting functions.

18. The copying machine of claim 15 further comprising a control panel having a manual override function key for pausing the document processing means during the performance of the set of copier functions in accordance with the control data set.

19. The copying machine of claim 15 wherein the two-dimensional bar coded symbol includes an application code for identifying a job type, said decoder further comprising a job type comparator interface ensuring that the job instructions encoded on the two-dimensional bar coded symbol may be processed with the document processing means.

20. A copying machine for copying a plurality of documents in accordance with a set of job instructions encoded on a printed two-dimensional bar coded symbol, said copying machine comprising:

a two-dimensional bar code reader for reading the printed two-dimensional bar coded symbol;

an interface coupled to said two-dimensional bar code reader for receiving from the two-dimensional bar code reader an electrical representation of the set of job instructions encoded on the printed two-dimensional bar coded symbol, for decoding the received electrical representation of the set of job instruction encoded on the printed two-dimensional bar coded symbol and for converting the received electrical representation of the set of job instructions encoded on the printed two-dimensional bar coded symbol into a control data set;

a controller coupled to the interface for receiving from the interface the control data set and for controlling a set of copier functions in accordance with the control data set;

a document processor coupled to the controller for performing the set of copier functions in accordance with the control data set, whereby the plurality of documents are processed in accordance with the set of job instructions encoded on the printed two-dimensional bar coded symbol; and a communication bus coupled to the interface for communication of a plurality of billing information decoded from the two-dimensional bar coded symbol to a remote billing subsystem, whereby the plurality of billing information is encoded on the printed two-dimensional bar code symbol as part of the job instructions.

21. A copying machine for copying a plurality of documents in accordance with a set of job instructions encoded on a printed two-dimensional bar coded symbol including the set of job control instructions and a document data, said copying machine comprising:

a two-dimensional bar code reader for reading the printed two-dimensional bar coded symbol;

an interface coupled to said two-dimensional bar code reader for decoding the two-dimensional bar coded symbol into the document data and a control data set corresponding to said job instructions;

a controller coupled to the interface for controlling a set of copier functions in accordance with the control data set; and a document processor coupled to the controller for performing the set of copier functions on the document data in accordance with the control data set, whereby the plurality of documents is processed in accordance with the set of job instructions encoded on the printed two-dimensional bar coded symbol.

22. A facsimile machine for transmitting a plurality of documents to a remote destination in accordance with a set of job control instructions encoded on a printed two-dimensional bar coded symbol including the set of job control instructions and a document data, said facsimile machine comprising:

a two-dimensional bar code reader for reading the printed two-dimensional bar coded symbol;

an interface coupled to said two-dimensional bar code reader for receiving from the two-dimensional bar code reader an electrical representation of the set of job control instructions and the document data encoded on the printed two-dimensional bar coded symbol and for decoding the received electrical representation of the set of job control instructions encoded on the printed two-dimensional bar coded symbol;

a controller coupled to the interface for receiving from the interface the decoded electrical representation of the set of job control instructions encoded on the printed two-dimensional bar coded symbol and for controlling a set of facsimile functions in accordance with the set of job control instructions encoded on the printed two-dimensional bar coded symbol; and a document processor coupled to the controller for performing the set of facsimile functions on the document data in accordance with the set of job control instructions encoded on the printed two-dimensional bar coded symbol, whereby the plurality of documents is processed in accordance with the set of job control instructions encoded on the printed two-dimensional bar coded symbol.

23. A facsimile machine for transmitting a plurality of documents to a remote destination in accordance with a set of job control instructions encoded on a printed two-dimensional bar coded symbol including the set of job control instructions and a document data, said facsimile machine comprising:

a two-dimensional bar code reader for reading the printed two-dimensional bar code symbol;

an interface coupled to said two-dimensional bar code reader for receiving from the two-dimensional bar code reader an electrical representation of the set of job control instructions and the document data encoded on the printed two-dimensional bar coded symbol, for decoding the received electrical representation of the set of job control instructions and the document data encoded on the printed two-dimensional bar coded symbol and for converting the received electrical representation of the set of job control instructions encoded on the printed two-dimensional bar coded symbol into a control data set;

a controller coupled to the interface for receiving from the interface the control data set and for controlling a set of facsimile functions in accordance with the control data set; and a document processor coupled to the controller for performing the set of facsimile functions on the document data in accordance with the control data set, whereby the plurality of documents is processed in accordance with the set of job control instructions encoded on the printed two-dimensional bar code symbol.

* * * * *